United States Patent
Miya

(10) Patent No.: US 10,579,681 B2
(45) Date of Patent: Mar. 3, 2020

(54) PRIVILEGE INFORMATION MANAGEMENT SYSTEM AND PRIVILEGE INFORMATION MANAGEMENT PROGRAM

(71) Applicant: Infoscience Corporation, Tokyo (JP)

(72) Inventor: Norio Miya, Tokyo (JP)

(73) Assignee: Infoscience Corporation, Tokyo (JP)

( * ) Notice: Subject to any disclaimer, the term of this patent is extended or adjusted under 35 U.S.C. 154(b) by 93 days.

(21) Appl. No.: 15/753,618

(22) PCT Filed: Sep. 8, 2015

(86) PCT No.: PCT/JP2015/004556
§ 371 (c)(1),
(2) Date: Feb. 20, 2018

(87) PCT Pub. No.: WO2017/037767
PCT Pub. Date: Sep. 3, 2017

(65) Prior Publication Data
US 2018/0246991 A1    Aug. 30, 2018

(30) Foreign Application Priority Data

Sep. 2, 2015 (JP) ................... 2015-173347

(51) Int. Cl.
*H04L 29/06* (2006.01)
*G06F 21/00* (2013.01)
(Continued)

(52) U.S. Cl.
CPC .......... *G06F 16/9027* (2019.01); *G06F 21/60* (2013.01); *G06F 21/604* (2013.01);
(Continued)

(58) Field of Classification Search
CPC ...... G06F 16/9027; G06F 21/60; G06F 21/62; G06F 2221/2141; G06F 2221/2145; H04L 63/102
See application file for complete search history.

(56) References Cited

U.S. PATENT DOCUMENTS 7,865,959 B1 *   1/2011   Lewis ................. G06F 21/6218
                                                              726/17
2001/0007133 A1   7/2001   Moriconi et al.
(Continued)

FOREIGN PATENT DOCUMENTS

JP          7-64844 A        3/1995
WO      2005/006193 A1       1/2005

OTHER PUBLICATIONS

International Search Report dated Nov. 24, 2015, issued in counterpart International Application No. PCT/JP2015/004556 (1 page).

*Primary Examiner* — Alexander Lagor
*Assistant Examiner* — Rodman Alexander Mahmoudi
(74) *Attorney, Agent, or Firm* — Westerman, Hattori, Daniels & Adrian, LLP

(57) ABSTRACT

The privilege information management system stores a group tree configured with group nodes each representing a group configured with a member enabled to use a privilege, stores an object tree configured with object nodes each representing a target object to be used with a privilege, stores, in a releasable manner, privilege-valid link information indicating a connection between an arbitrary group node and an arbitrary object node in a privilege-valid mode, and regarding a first group node of the group nodes and a first object node of the object nodes connected by the privilege-valid link information, grants a privilege to use a target object of the first object node and a subordinate object node if there are any under the first object node to a member (Continued)

belonging to the first group node and a subordinate group node if there are any under the first group node.

5 Claims, 17 Drawing Sheets

(51) Int. Cl.
*G06F 16/901* (2019.01)
*G06F 21/62* (2013.01)
*G06F 21/60* (2013.01)

(52) U.S. Cl.
CPC .......... *G06F 21/62* (2013.01); *G06F 21/6218* (2013.01); *H04L 63/102* (2013.01); *H04L 63/104* (2013.01); *G06F 2221/2141* (2013.01); *G06F 2221/2145* (2013.01)

(56) References Cited

U.S. PATENT DOCUMENTS

| | | |
|---|---|---|
| 2005/0078559 A1* | 4/2005 | Herring .................... G06F 1/12 368/46 |
| 2006/0089932 A1 | 4/2006 | Buehler et al. |
| 2006/0190588 A1 | 8/2006 | Nakayama et al. |
| 2008/0133530 A1 | 6/2008 | Wang et al. |
| 2009/0094682 A1 | 4/2009 | Sage et al. |
| 2013/0024909 A1 | 1/2013 | Morita |
| 2014/0244840 A1* | 8/2014 | Sweeney ............... H04L 63/101 709/225 |

* cited by examiner

Fig. 4(a) DATA OF GROUP 3

| PROPERTY | VALUE |
|---|---|
| GROUP NAME | GENERAL MEMBER GROUP |
| GROUP ID | 3 |
| CREATION DATE | 2015/5/22 10:00 |
| CREATOR | admin |
| MAXIMUM NUMBER OF PEOPLE BELONGING | NO LIMITATION |
| MAXIMUM NUMBER OF GROUPS BELONGING | NO LIMITATION |

Fig. 4(b) DATA OF GROUP 6

| PROPERTY | VALUE |
|---|---|
| GROUP NAME | FREE MEMBER GROUP |
| GROUP ID | 6 |
| CREATION DATE | 2015/5/22 10:00 |
| CREATOR | admin |
| MAXIMUM NUMBER OF PEOPLE BELONGING | NO LIMITATION |
| MAXIMUM NUMBER OF GROUPS BELONGING | 0 |

Fig. 5(a) DATA OF MEMBER 1

| PROPERTY | VALUE |
|---|---|
| MEMBER NAME | TARO SATO |
| MEMBER ID | 1001 |
| REGISTRATION DATE | 2015/5/22 12:00 |
| EMAIL ADDRESS | taros@infoscience.co.jp |
| ADDRESS | 2-4-1, SHIBAURA, MINATO-KU, TOKYO |
| COMPANY NAME | INFOSCIENCE CORPORATION |

Fig. 5(b) DATA OF MEMBER 2

| PROPERTY | VALUE |
|---|---|
| MEMBER NAME | JIRO SUZUKI |
| MEMBER ID | 1002 |
| REGISTRATION DATE | 2015/5/22 12:00 |
| EMAIL ADDRESS | jiros@infoscience.co.jp |
| ADDRESS | 2-4-1, SHIBAURA, MINATO-KU, TOKYO |
| COMPANY NAME | INFOSCIENCE CORPORATION |

Fig. 6(a) DATA OF OBJECT C

| PROPERTY | VALUE |
|---|---|
| OBJECT NAME | CLASSROOM 1 |
| OBJECT ID | C |
| ADDRESS 1 | 2-4-1, SHIBAURA, MINATO-KU, TOKYO |
| ADDRESS 2 | INFOSCIENCE BUILDING, 2ND FLOOR |
| SEATING CAPACITY | 20 PEOPLE |
| AVAILABLE TIME | MON. TO FRI. 9:00-17:30 |

Fig. 6(b) DATA OF OBJECT D

| PROPERTY | VALUE |
|---|---|
| OBJECT NAME | MICROPHONE IN CLASSROOM 1 |
| OBJECT ID | D |
| EQUIPMENT CODE | 00010-0001 |
| MAKER NAME | JVC |
| MODEL NUMBER | PE-W51S-M |
| PURCHASE DATE | 2011/4/1 |
| PURCHASE PRICE | ¥88,200 |

Fig. 6(c) DATA OF OBJECT E

| PROPERTY | VALUE |
|---|---|
| OBJECT NAME | PROJECTOR IN CLASSROOM 1 |
| OBJECT ID | E |
| EQUIPMENT CODE | 00010-0002 |
| MAKER NAME | epson |
| MODEL NUMBER | EB-S03 |
| PURCHASE DATE | 2014/9/1 |
| PURCHASE PRICE | ¥38,800 |

Fig. 9(a)

| GROUP ID | OBJECT ID | USE PRIVILEGE |
|---|---|---|
| 3 | C | VALID |

Fig. 9(b)

| GROUP ID OR MEMBER ID | GROUP NAME OR MEMBER NAME | OBJECT ID | OBJECT NAME | USE PRIVILEGE |
|---|---|---|---|---|
| 3 | GENERAL MEMBER | C | CLASSROOM 1 | VALID |
| | | D | MICROPHONE IN CLASSROOM 1 | VALID |
| | | E | PROJECTOR IN CLASSROOM 1 | VALID |
| 6 | FREE MEMBER | C | CLASSROOM 1 | VALID |
| | | D | MICROPHONE IN CLASSROOM 1 | VALID |
| | | E | PROJECTOR IN CLASSROOM 1 | VALID |
| 1001 | TARO SATO | C | CLASSROOM 1 | VALID |
| | | D | MICROPHONE IN CLASSROOM 1 | VALID |
| | | E | PROJECTOR IN CLASSROOM 1 | VALID |
| 1002 | JIRO SUZUKI | C | CLASSROOM 1 | VALID |
| | | D | MICROPHONE IN CLASSROOM 1 | VALID |
| | | E | PROJECTOR IN CLASSROOM 1 | VALID |

Fig. 12(a)

| GROUP ID | OBJECT ID | USE PRIVILEGE |
|---|---|---|
| 3 | C | VALID |
| 6 | D | INVALID |

Fig. 12(b)

| GROUP ID OR MEMBER ID | GROUP NAME OR MEMBER NAME | OBJECT ID | OBJECT NAME | USE PRIVILEGE |
|---|---|---|---|---|
| 3 | GENERAL MEMBER | C | CLASSROOM 1 | VALID |
| | | D | MICROPHONE IN CLASSROOM 1 | VALID |
| | | E | PROJECTOR IN CLASSROOM 1 | VALID |
| 6 | FREE MEMBER | C | CLASSROOM 1 | VALID |
| | | D | MICROPHONE IN CLASSROOM 1 | INVALID |
| | | E | PROJECTOR IN CLASSROOM 1 | VALID |
| 1001 | TARO SATO | C | CLASSROOM 1 | VALID |
| | | D | MICROPHONE IN CLASSROOM 1 | INVALID |
| | | E | PROJECTOR IN CLASSROOM 1 | VALID |
| 1002 | JIRO SUZUKI | C | CLASSROOM 1 | VALID |
| | | D | MICROPHONE IN CLASSROOM 1 | INVALID |
| | | E | PROJECTOR IN CLASSROOM 1 | VALID |

Fig. 15(a)

| GROUP ID | OBJECT ID | USE PRIVILEGE |
|---|---|---|
| 3 | C | VALID |
| 6 | D | INVALID |
| 6 | D | VALID |

Fig. 15(b)

| GROUP ID OR MEMBER ID | GROUP NAME OR MEMBER NAME | OBJECT ID | OBJECT NAME | USE PRIVILEGE |
|---|---|---|---|---|
| 3 | GENERAL MEMBER | C | CLASSROOM 1 | VALID |
| | | D | MICROPHONE IN CLASSROOM 1 | VALID |
| | | E | PROJECTOR IN CLASSROOM 1 | VALID |
| 6 | FREE MEMBER | C | CLASSROOM 1 | VALID |
| | | D | MICROPHONE IN CLASSROOM 1 | VALID |
| | | E | PROJECTOR IN CLASSROOM 1 | VALID |
| 1001 | TARO SATO | C | CLASSROOM 1 | VALID |
| | | D | MICROPHONE IN CLASSROOM 1 | VALID |
| | | E | PROJECTOR IN CLASSROOM 1 | VALID |
| 1002 | JIRO SUZUKI | C | CLASSROOM 1 | VALID |
| | | D | MICROPHONE IN CLASSROOM 1 | VALID |
| | | E | PROJECTOR IN CLASSROOM 1 | VALID |

Fig. 18(a)

| GROUP ID | OBJECT ID | USE PRIVILEGE |
|---|---|---|
| 3 | C | VALID |

Fig. 18(b)

| MEMBER ID | OBJECT ID | USE PRIVILEGE |
|---|---|---|
| 1002 | B | VALID |

Fig. 18(c)

| GROUP ID OR MEMBER ID | GROUP NAME OR MEMBER NAME | OBJECT ID | OBJECT NAME | USE PRIVILEGE |
|---|---|---|---|---|
| 3 | GENERAL MEMBER | C | CLASSROOM 1 | VALID |
| | | D | MICROPHONE IN CLASSROOM 1 | VALID |
| | | E | PROJECTOR IN CLASSROOM 1 | VALID |
| 6 | FREE MEMBER | C | CLASSROOM 1 | VALID |
| | | D | MICROPHONE IN CLASSROOM 1 | VALID |
| | | E | PROJECTOR IN CLASSROOM 1 | VALID |
| 1001 | TARO SATO | C | CLASSROOM 1 | VALID |
| | | D | MICROPHONE IN CLASSROOM 1 | VALID |
| | | E | PROJECTOR IN CLASSROOM 1 | VALID |
| 1002 | JIRO SUZUKI | B | CONFERENCE ROOM | VALID |
| | | C | CLASSROOM 1 | VALID |
| | | D | MICROPHONE IN CLASSROOM 1 | VALID |
| | | E | PROJECTOR IN CLASSROOM 1 | VALID |

ID is granted an authority to perform tasks and performs a task inside a company, and for fixedly setting detailed data on a registered user, a user of an authority and the like for each node. For this reason, such systems are not suitable for management requiring flexibility and promptness, for example, in the case of granting of an authority to use a specific use object such as traveling or a lesson to a group formed in a hierarchical structure at any time on a website.

PRIVILEGE INFORMATION MANAGEMENT SYSTEM AND PRIVILEGE INFORMATION MANAGEMENT PROGRAM

TECHNICAL FIELD

The present invention relates to a privilege information management system and a privilege information management program for managing a privilege required by a user to use a use object, by use of a tree data structure.

BACKGROUND ART

The management system described in Patent Document 1 serves as a system for managing an authority required by a user to use a use object, by the use of a tree data structure. In the management system according to Patent Document 1, a general node corresponding to a processing object is set as a parent node, and a function node corresponding to processing is set as a child node of the general node corresponding to the processing object to which the processing corresponding to the function node is to be implemented, and further a registered user and an operation authority for each registered user are set to a general node corresponding to a processing object. When a registered user requests execution of processing corresponding to a function node, the management system makes the function node execute the processing only if the processing is permitted by a registered user operation authority of the registered user which is set to the general node serving as the parent node of the function node.

This management system is considered capable of providing safe and efficient management by explicitly correlating a general node corresponding to a processing object with a function node corresponding to processing and setting an authority for each user to these, and thereby clarifying a processing object and a range operable by a user. It is noted that Patent Document 1 further discloses a directory management of Unix (registered trademark) configured in a tree structure for setting attributes of an owner and a group for each node composed of a directory and/or a file.

CITATION LIST

Patent Literature

Patent Document 1: International Publication No. WO 2005/006193

SUMMARY OF INVENTION

Technical Problem

The management system and the Unix directory management system described as an invention in Patent Document 1 are suitable in cases where strict management for users, use objects, and processing contents for use objects is required, such as when an employee who is managed by an The present invention is proposed in view of the above-described problem, and the object of the present invention is to provide a privilege information management system and a privilege information management program realizing privilege management having high flexibility and promptness in the privilege management for managing a privilege required by a user to use a use object.

Solution to Problem

The privilege information management system according to the present invention stores a group tree configured with group nodes each representing a group configured with a member enabled to use a privilege, stores an object tree configured with object nodes each representing a target object to be used with a privilege, stores, in a releasable manner, privilege-valid link information indicating a connection between an arbitrary group node of the group nodes and an arbitrary object node of the object nodes in a privilege-valid mode, and regarding a first group node of the group nodes and a first object node of the object nodes connected by the privilege-valid link information, grants a privilege to use a target object of the first object node and a subordinate object node if there are any under the first object node to a member belonging to the first group node and a subordinate group node if there are any under the first group node.

The groups as a whole may have a configuration including both groups each configured with a single member and groups each configured with a plurality of members, a configuration including only groups each configured with a plurality of members, or a configuration including only groups each configured with a single member.

According to the above feature, in the case where the privilege to use an arbitrary target object or arbitrary target objects is granted to an arbitrary group or arbitrary groups, the use privilege is granted simply by connecting the group node and the object node in a privilege-valid mode. In the case of releasing the state where the use privilege is granted, the use privilege is released simply by the deletion of the privilege-valid link information for deletion of the connection. Accordingly, privilege management having high flexibility and promptness is realized in the privilege management for managing a privilege required by a user to use a use object. For example, in the case of granting or releasing of a privilege to use a specific use object such as traveling or a lesson to a group formed in a hierarchical structure on a website at any time, management requiring flexibility and promptness is preferably performed.

The privilege information management system according to the present invention stores, in a releasable manner, privilege-invalid link information indicating a connection between an arbitrary group node of the group nodes and an arbitrary object node of the object nodes in a privilege-invalid mode, does not grant, regarding a second group node of the group nodes and a second object node of the object nodes connected by the privilege-invalid link information, a privilege to use a target object of the second object node and a subordinate object node if there are any under the second object node to a member belonging to the second group node and a subordinate group node if there are any under the second group node, and determines, on the basis of link information existing on a shortest route having the minimum number of links among a plurality of routes for connecting the group node and the object node in an overlapping relation with respect to granting of a use privilege and non-granting of a use privilege, whether to grant a privilege to use a target object of the object node in the overlapping relation and a subordinate object node if there are any under the object node to a member belonging to the group node in the overlapping relation and a subordinate group node if there are any under the group node.

According to the above feature, as an example, in the case where a privilege to use arbitrary target objects is granted to arbitrary groups, connection in the privilege-invalid mode between a subordinate group under the group directly connected in the privilege-valid mode and a subordinate target object under the target object directly connected in the privilege-valid mode restricts a specific group from using a specific target object, and thus enables the implementation of flexible management adaptable in more various cases, such as a case where a group not having paid a fee yet is disabled from using a service. A determination as to whether to grant a use privilege in the case of being in an overlapping relation is made on the basis of the link information existing on the shortest route having the minimum number of links, thereby enabling to perform prompt determination as to whether to grant the use privilege without requiring complicated calculation processing.

The privilege information management system according to the present invention grants, in the case where, regarding the group node and the object node in the overlapping relation with respect to granting of a use privilege and non-granting of a use privilege, both are connected in the overlapping relation with respect to granting of a use privilege and non-granting of a use privilege by a plurality of shortest routes respectively being equal in number of links and being equal in distance, the privilege to use the target object of the object node in the overlapping relation and the subordinate object node if there are any under the object node to the member belonging to the group node in the overlapping relation and the subordinate group node if there are any under the group node.

According to the above feature, in the case where there are only the routes equal in distance as the shortest connection route between the group and the target object in the overlapping relation with respect to granting of a use privilege and non-granting of a use privilege, uniform granting of the use privilege enables to provide group members with a service by the target object while securing a more beneficial state.

The privilege information management system according to the present invention stores, in a releasable manner, individual link information indicating a connection between a member node of an individual member defined in a master and slave relation with the group node and an arbitrary object node of the object nodes, in the privilege-valid mode or the privilege-invalid mode, and determines whether to grant the privilege to use the target object of the arbitrary object node to the individual member by giving top priority to the mode of the individual link information.

According to the above feature, a determination as to whether to grant a use privilege to an individual member by giving the top priority to the mode of the individual link information enables to more flexibly provide a service by a target object suitable for the state or the demand of the individual member.

The privilege information management program according to the present invention makes a computer function so as to store a group tree configured with group nodes each representing a group configured with a member enabled to use a privilege, store an object tree configured with object nodes each representing a target object to be used with a privilege, store, in a releasable manner, privilege-valid link information indicating a connection between an arbitrary group node of the group nodes and an arbitrary object node of the object nodes in a privilege-valid mode, and grant, regarding a first group node of the group nodes and a first object node of the object nodes connected by the privilege-valid link information, a privilege to use a target object of the first object node and a subordinate object node if there are any under the first object node to a member belonging to the first group node and a subordinate group node if there are any under the first group node. The groups as a whole may have a configuration including both groups each configured with a single member and groups each configured with a plurality of members, a configuration including only groups each configured with a plurality of members, or a configuration including only groups each configured with a single member.

According to the above feature, in the case where the privilege to use an arbitrary target object or arbitrary target objects is granted to an arbitrary group or arbitrary groups, the use privilege is granted simply by connecting the group node and the object node in a privilege-valid mode. In the case of releasing of the state where the use privilege is granted, the use privilege is released simply by the deletion of the privilege-valid link information for deletion of the connection. Accordingly, privilege management having high flexibility and promptness is realized in the privilege management for managing a privilege required by a user to use a use object. For example, in the case of granting or releasing of a privilege to use a specific use object such as traveling or a lesson to a group formed in a hierarchical structure on a website at any time, management requiring flexibility and promptness is preferably performed.

The privilege information management program according to the present invention makes a computer function so as to store, in a releasable manner, privilege-invalid link information indicating a connection between an arbitrary group node of the group nodes and an arbitrary object node of the object nodes in a privilege-invalid mode, not to grant, regarding a second group node of the group nodes and a second object node of the object nodes connected by the privilege-invalid link information, a privilege to use a target object of the second object node and a subordinate object node if there are any under the second object node to a member belonging to the second group node and a subordinate group node if there are any under the second group node, and to determine, on the basis of link information existing on a shortest route having the minimum number of links among a plurality of routes for connecting the group node and the object node in an overlapping relation with respect to granting of a use privilege and non-granting of a use privilege, whether to grant a privilege to use a target object of the object node in the overlapping relation and a subordinate object node if there are any under the object node to a member belonging to the group node in the overlapping relation and a subordinate group node if there are any under the group node.

According to the above feature, as an example, in the case where a privilege to use arbitrary target objects is granted to arbitrary groups, connection in the privilege-invalid mode between a subordinate group under the group directly connected in the privilege-valid mode and a subordinate target object under the target object directly connected in the privilege-valid mode restricts a specific group from using a specific target object, and thus enables the implementation of flexible management adaptable to more various cases, such as a case where a group not having paid a fee yet is disabled from using a service. A determination as to whether to grant a use privilege in the case of being in an overlapping relation is made on the basis of the link information existing on the shortest route having the minimum number of links, thereby enabling to perform prompt determination as to whether to grant the use privilege without requiring complicated calculation processing.

Advantageous Effects of Invention

The present invention enables to realize privilege management having high flexibility and promptness in the privilege management for managing a privilege required by a user to use a use object.

BRIEF DESCRIPTION OF DRAWINGS

FIG. 4($a$) is a data table illustrating an example of data corresponding to the group node having a group ID: 3, while FIG. 4($b$) is a data table illustrating an example of data corresponding to the group node having a group ID: 6.

FIG. 5($a$) is a data table illustrating an example of data corresponding to the member node having a member ID: 1001, while FIG. 5($b$) is a data table illustrating an example of data corresponding to the member node having a member ID: 1002.

FIG. 6($a$), FIG. 6($b$), and FIG. 6($c$) are data tables respectively illustrating examples of data corresponding to the object nodes having an object ID: C, an object ID: D, and an object ID: E.

FIG. 9($a$) is a data table illustrating an example of the privilege-valid link information of FIG. 7, while FIG. 9($b$) is a data table illustrating an example of the set use privilege information stored by connection processing by use of the privilege-valid link information of FIG. 7.

FIG. 12($a$) is a data table illustrating an example of the privilege-valid link information of FIG. 7 and the privilege-invalid link information of FIG. 10, while FIG. 12($b$) is a data table illustrating an example of the set use privilege information stored in response to the connection processing by use of the privilege-invalid link information of FIG. 10.

FIG. 15($a$) is a data table illustrating an example of the privilege-valid link information of FIG. 7 and FIG. 13 and the privilege-invalid link information of FIG. 10, while FIG. 15($b$) is a data table illustrating an example of the set use privilege information stored in response to the connection processing by use of the privilege-valid link information of FIG. 13.

FIG. 18($a$) is a data table illustrating an example of the privilege-valid link information of FIG. 7 and FIG. 18($b$) is a data table illustrating an example of the individual link information of FIG. 16 and FIG. 18($c$) is a data table illustrating an example of the set use privilege information stored in response to the connection processing by use of the individual link information of FIG. 16.

DESCRIPTION OF EMBODIMENTS

[Privilege Information Management System and Privilege Information Management Program According to First Embodiment]

Figure 1:
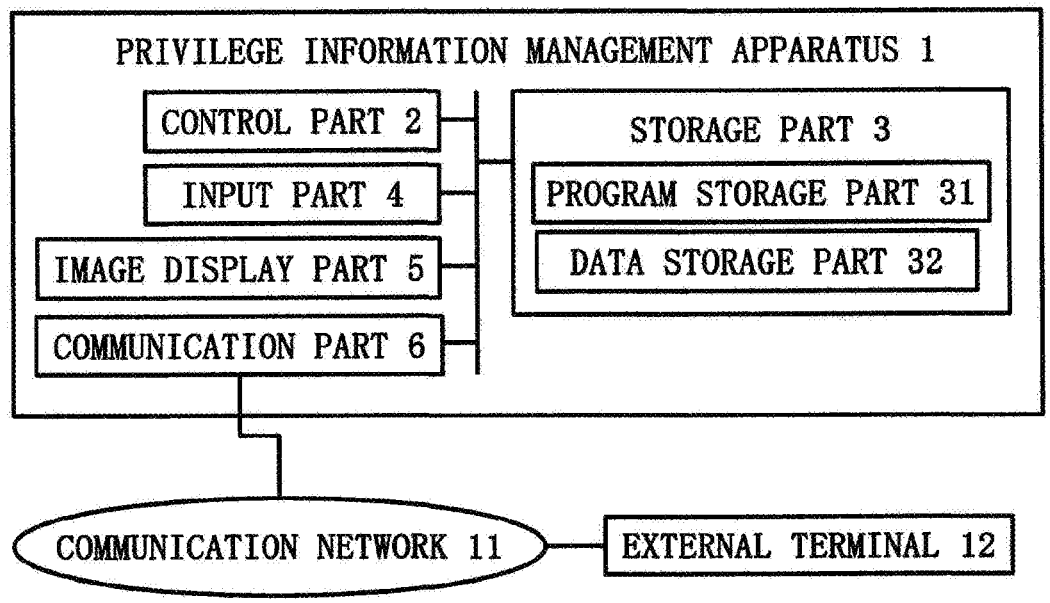
FIG. 1 is a block diagram illustrating a privilege information management system of a first embodiment according to the present invention.

A privilege information management system of a first embodiment according to the present invention is configured with a privilege information management apparatus 1 shown in FIG. 1. The privilege information management apparatus 1, which is configured with, for example, a single server or a plurality of servers connected communicably, includes a control part 2 such as a CPU for executing processing based on a predetermined control program, a storage part 3 such as a memory and a hard disk, an input part 4 such as a keyboard and a mouse, an image display part 5 such as a liquid crystal display, and a communication part 6 for performing communication with the outside. The privilege information management apparatus 1 is connected to an external terminal 12 such as a client terminal via a communication network 11 such as the Internet controlled by a communication part.

The external terminal 12, which is configured with a personal computer or a multifunctional mobile terminal, for example, a smartphone, includes a control part such as a CPU for executing processing according to a predetermined control program, a storage part such as a memory or a hard disk, an input part such as a keyboard or a mouse, an image display part such as a liquid crystal display, and a communication part for performing communication via the communication network 11.

Figure 2:
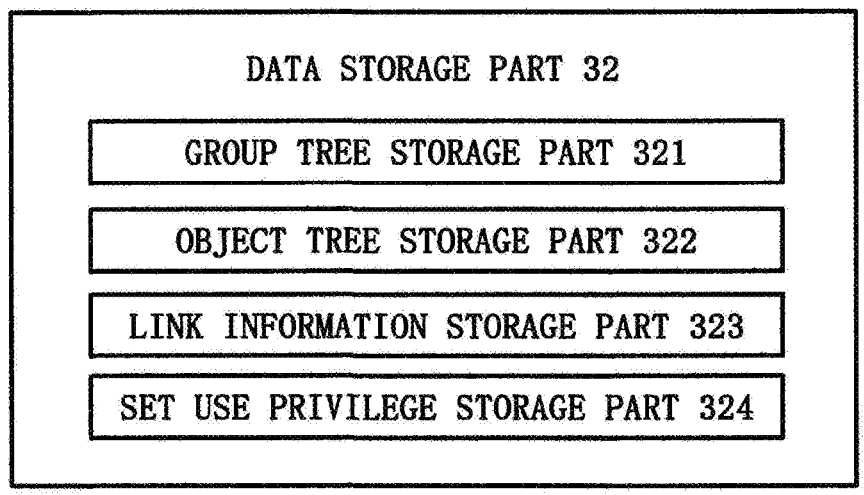
FIG. 2 is a block diagram illustrating a configuration of a data storage part in the privilege information management system of the first embodiment.

As shown in FIG. 2, the storage part 3 of the privilege information management apparatus 1 has a program storage part 31 for storing a control program of the privilege information management apparatus 1 such as a program of an operating system and a privilege information management program, and a data storage part 32 for storing data for use in the processing based on the privilege information management program.

Figure 3:
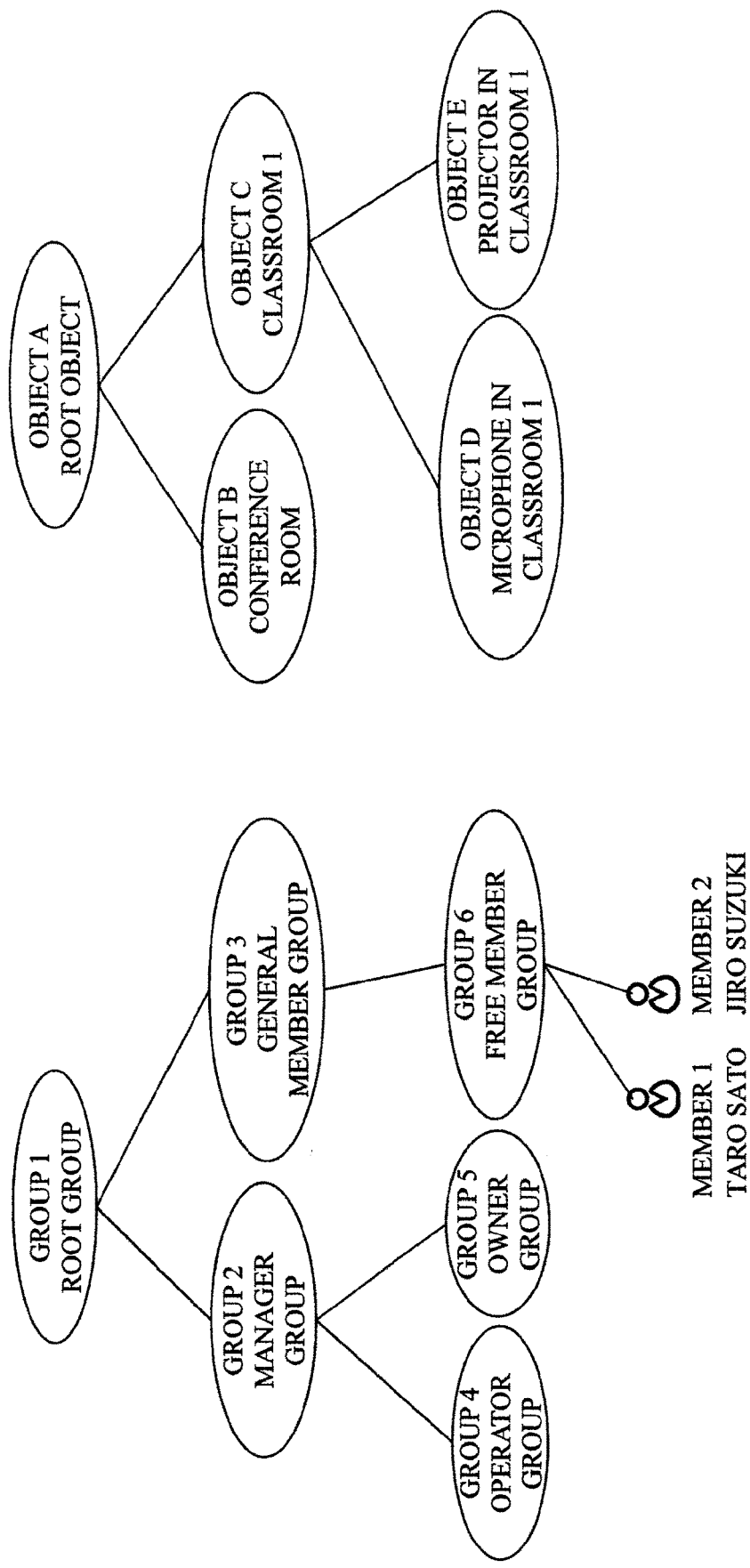
FIG. 3 is a block diagram illustrating relations of a group tree and an object tree in an example of the privilege information management system of the first embodiment.

The data storage part 32 has a group tree storage part 321, an object tree storage part 322, a link information storage part 323, and a set use privilege storage part 324. The group tree storage part 321 stores a group tree including group nodes each representing a group including members each being able to use a privilege. In the group tree according to the present embodiment, the group node of the root group appropriately defined as a conceptual group such as an aggregate of a provider side and a user side of a specific service is set as a vertex, and the group nodes thereof are defined in a hierarchical master and slave relation, and further, a member node of the member belonging to the bottom group is defined further in a master and slave relation with the bottom group node (refer to FIG. 3).

Further, the group tree storage part 321 stores data of respective groups and data of respective members corresponding to group nodes and member nodes in the group tree. FIG. 4(a) and FIG. 4(b) respectively show examples of data corresponding to the group nodes respectively having a group ID: 3 and a group ID: 6 (data of a group 3 and a group 6), and FIG. 5(a) and FIG. 5(b) respectively show examples of data corresponding to the member nodes having a member ID: 1001 and a member ID: 1002 belonging to the group 6 (data of a member 1 and a member 2).

The object tree storage part 322 stores an object tree including object nodes each representing a target object to be used with privilege. In the object tree according to the present embodiment, the object node of the root group appropriately defined as a conceptual group, for example, an aggregate of specific provided facilities is set as a vertex, and the object nodes thereof are defined in a hierarchical master and slave relation. The object tree storage part 322 stores data of respective objects corresponding to object nodes in the object tree. FIG. 6(a), FIG. 6(b), and FIG. 6(c) respectively show examples of data corresponding to the object nodes respectively having an object ID: C, an object ID: D, and an object ID: E (data of an object C, an object D, and an object E).

The link information storage part 323 stores, each in a releasable manner, required privilege-valid link information, required privilege-invalid link information and required individual link information which have been set. The privilege-valid link information indicates a connection between an arbitrary group node and an arbitrary object node in a privilege-valid mode, and may correspond to, for example, the information for specifying at least a group ID and an object ID linked in a privilege-valid mode. The privilege-invalid link information indicates a connection between an arbitrary group node and an arbitrary object node in a privilege-invalid mode, and may correspond to, for example, the information for specifying at least a group ID and an object ID linked in a privilege-invalid mode. The individual link information indicates a connection in a privilege-valid mode or a privilege-invalid mode between an arbitrary object node and a member node of an individual member defined in a master and slave relation with a group node, and may correspond to, for example, the information for specifying at least a member ID and an object ID linked in a privilege-valid mode or a privilege-invalid mode (refer to the examples of FIGS. 9(a) and 9(b), FIGS. 12(a) and 12(b), FIGS. 15(a) and 15(b), and FIGS. 18(a) to 18(c).

The set use privilege storage part 324 stores, on the basis of the link information stored in the link information storage part 323, the set use privilege information of the object nodes with respect to which a group node and a member node related to the link information respectively have use privileges. As an example, in the case where an arbitrary group node and an arbitrary object node are connected by privilege-valid link information, the set use privilege information stores all of the object nodes with respect to which the arbitrary group node corresponding to the top in the link relation, the subordinate group node(s) thereof, and the member node(s) belonging to the bottom group node(s) thereof respectively have use privileges. Alternatively, the set use privilege information may be configured to store only the object nodes with respect to which the arbitrary group node corresponding to the top in the link relation has use privileges, or the object nodes with respect to which the member node(s) belonging to the bottom group node(s) thereof has use privileges, and thereby, in response to reception of input inquiry of a use privilege not having been stored as the set use privilege information, to execute calculation processing of recognizing the use privilege with respect to the inquired group node or member node by tracing the group tree and the object tree (refer to the examples of FIGS. 9(a) and 9(b), FIGS. 12(a) and 12(b), FIGS. 15(a) and 15(b), and FIGS. 18(a) to 18(c).

Figure 7:
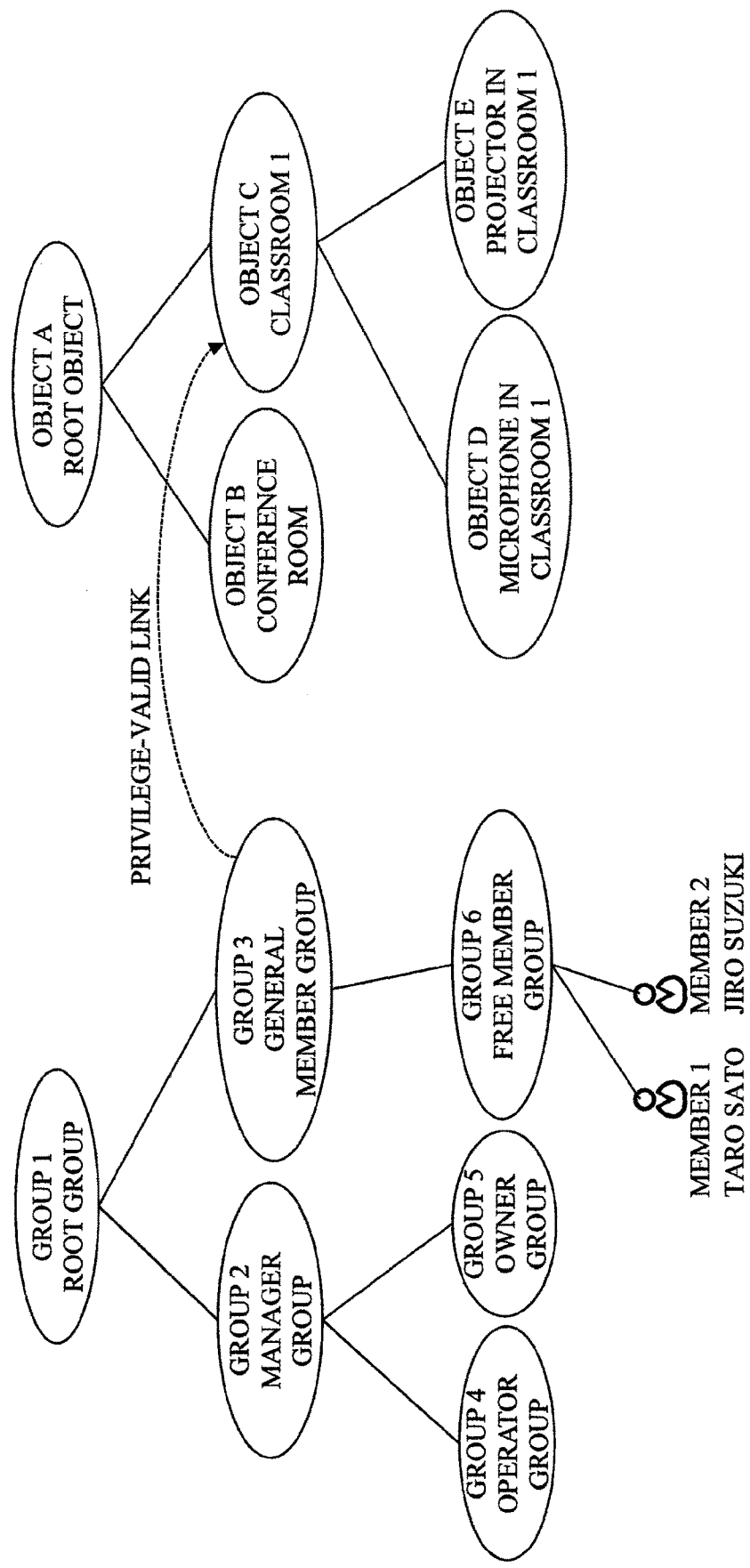
FIG. 7 is a block diagram illustrating a state in which the group node of a group 3 and the object node of an object C are connected by privilege-valid link information in the relation between the group tree and the object tree of the example in FIG. 3.
Figure 8:
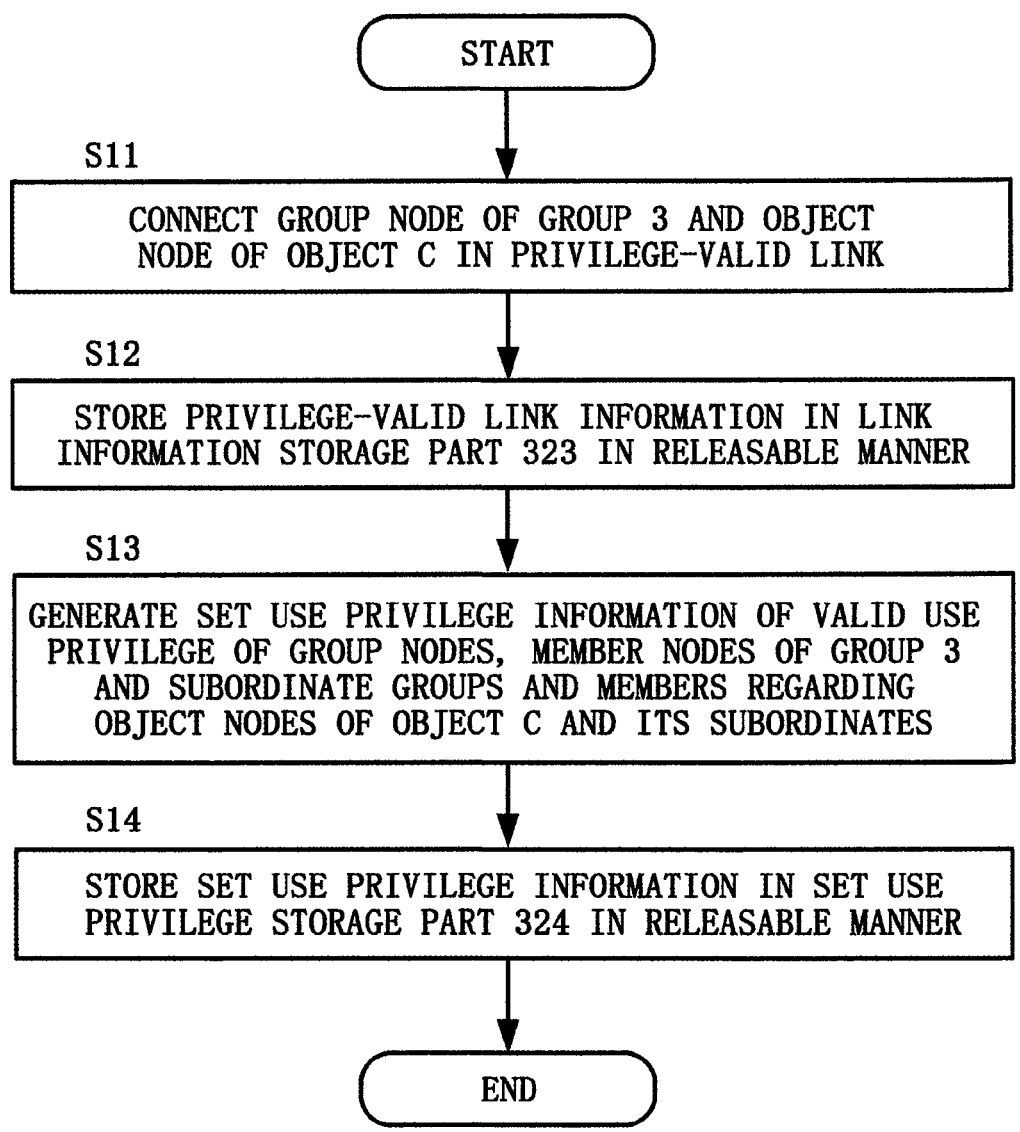
FIG. 8 is a flowchart indicating an example of processing of setting set use privilege information through connection by use of the privilege-valid link information of FIG. 7.

In the privilege information management apparatus 1, in the case of connecting a group node in the group tree stored in the group tree storage part 321 and an object node in the object tree stored in the object tree storage part 322 by the privilege-valid link information, the control part 2 connects, in response to input from the input part 4 or in response to reception or input from the external terminal 12, the group node of the specified group 3 and the object node of the specified object C by the privilege-valid link information (S11) as shown in FIG. 7 and FIG. 8, and then stores the privilege-valid link information in the link information storage part 323 in a releasable manner (S12).

On the other hand, the control part 2 traces the object tree to specify the object D and the object E as the subordinate object nodes under the object C, and generates the set use privilege information in which the group 3 has valid privileges to use the object C, the object D, and the object E, and further traces the group tree to specify the group 6, the member 1 and the member 2 as the subordinate group node and the subordinate member nodes under the group 3, and generates the set use privilege information in which the group 6, the member 1 and the member 2 each has valid privileges to use the object C, the object D, and the object E (S13). Then, the control part 2 stores the generated set use privilege information in the set use privilege storage part 324 in a releasable manner (S14). FIG. 9(a) and FIG. 9(b) respectively show the privilege-valid link information and the generated and stored set use privilege information according to the present example.

In other words, the control part 2 grants a privilege to use the target object of the object node of the object C to, in the case where there is a subordinate group node under the group node of the group 3 connected by the privilege-valid link information, the member 1 and the member 2 of the group node of the subordinate group 6, or in the case of connecting the group 6 by the privilege-valid link information, the member 1 and the member 2 belonging to the group 6, and further grants privileges to use the target objects of the object nodes of the object C, the object D and the object E in the case where there are the object nodes of the object D and the object E under the object node of the object C.

Figure 10:
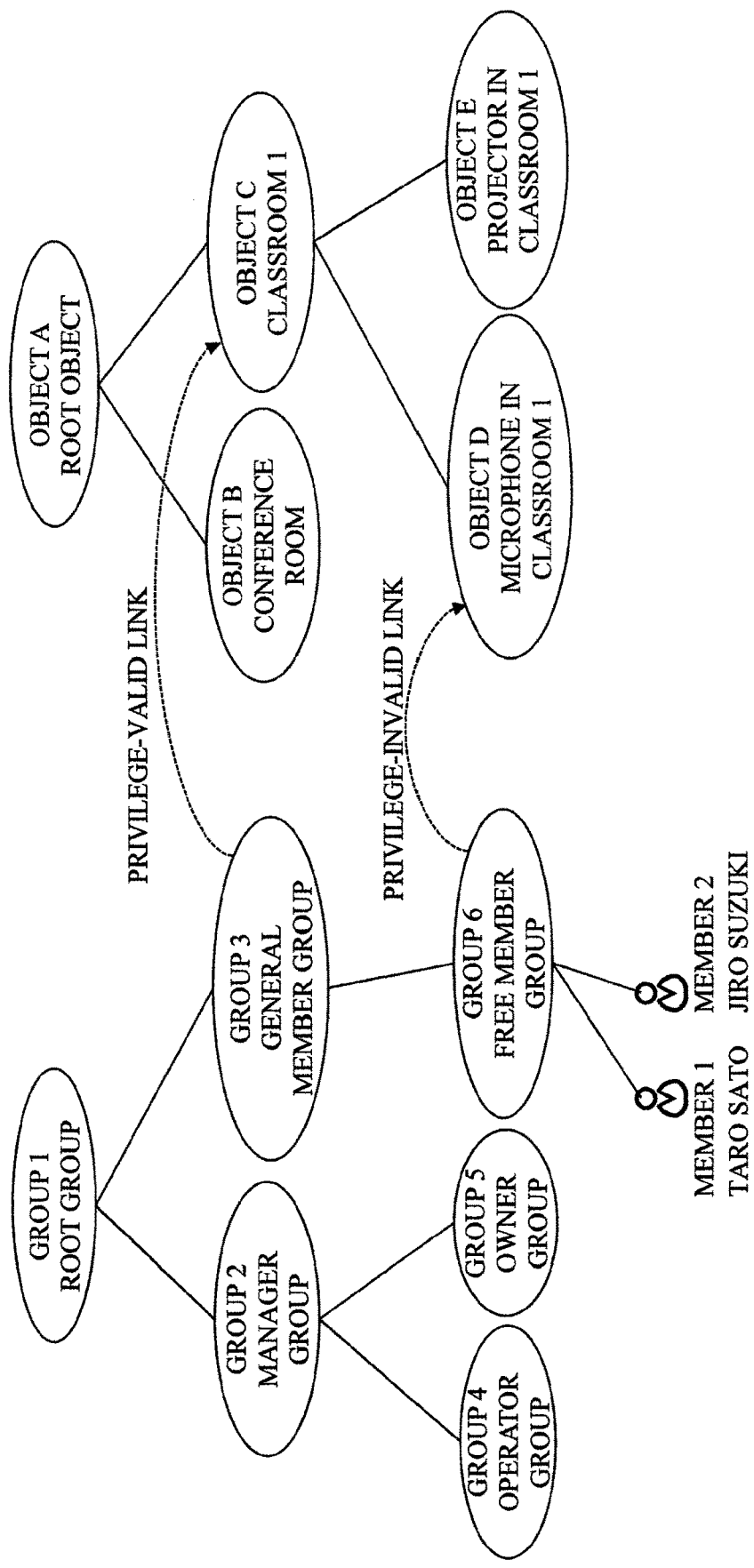
FIG. 10 is a block diagram illustrating a state in which, in the state of FIG. 7, the group node of a group 6 and the object node of an object D are connected by privilege-invalid link information.
Figure 11:
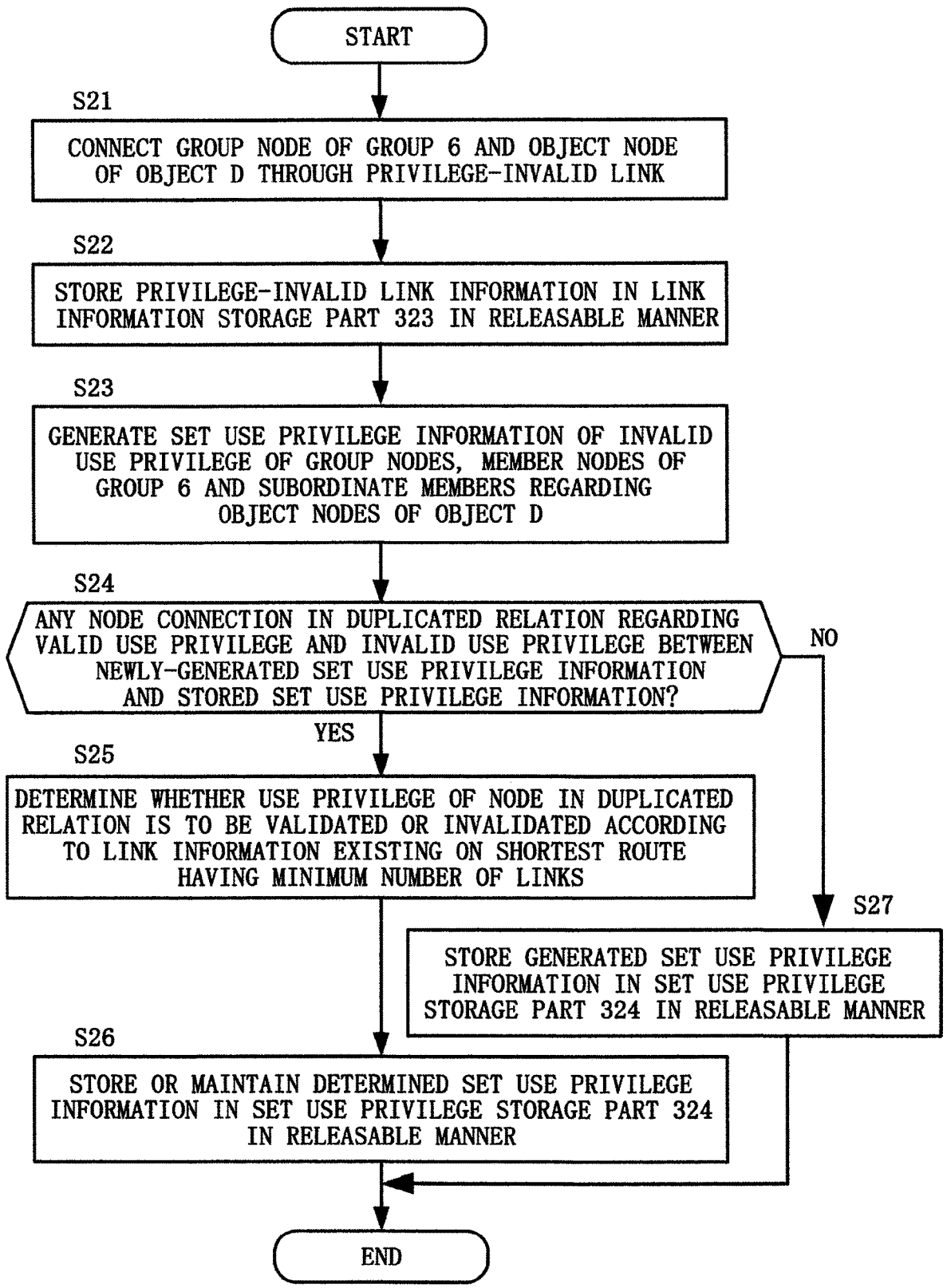
FIG. 11 is a flowchart indicating an example of processing for setting the set use privilege information through connection by use of the privilege-invalid link information of FIG. 10.

In the privilege information management apparatus 1, in the case of connecting a group node in the group tree stored in the group tree storage part 321 and an object node in the object tree stored in the object tree storage part 322 by the privilege-invalid link information, the control part 2 connects, in response to input from the input part 4 or in response to reception or input from the external terminal 12, the group node of the specified group 6 and the object node of the specified object D by the privilege-invalid link information (S21) as shown in FIG. 10 and FIG. 11, and then stores the privilege-invalid link information in the link information storage part 323 in a releasable manner (S22).

In the case of finding a subordinate object node under the object D by tracing the object tree, the control part 2 specifies the subordinate object node, generates the set use privilege information in which the privileges to use the object D and the subordinate objects thereof are invalidated and not granted to the group 6, and stores the generated set use privilege information in the set use privilege storage part 324 in a releasable manner. In the example of FIG. 10, the object D is configured as a bottom object node, and thus the control part 2 generates the set use privilege information in which the privilege to use the object D is invalidated and not granted to the group 6 (S23), and then stores the generated set use privilege information in the set use privilege storage part 324 in a releasable manner.

Additionally, the control part 2 traces the group tree to specify a group node under the group 6, and a member node belonging to or being under the group node, generates the set use privilege information in which the privilege to use the object D is invalidated and not granted to the group node, a member node group or a member, and stores the generated set use privilege information in the set use privilege storage part 324 in a releasable manner. In the example of FIG. 10, since there are only the member nodes of the member 1 and the member 2 belonging to or being under the group 6 with no group node under the group 6, the control part 2 specifies the member 1 and the member 2, generates the set use privilege information in which the privilege to use the object D is invalidated and not granted to the member 1 or the member 2 (S23), and then stores the generated set use privilege information in the set use privilege storage part 324 in a releasable manner.

At this time, prior to storage of the newly-generated set use privilege information, the control part 2 checks, from the set use privilege information having been stored in the set use privilege storage part 324 or from the set use privilege information obtained through calculation processing of tracing the tree based on the stored set use privilege information, existence/absence of the group node and the object node having an overlapping relation due to the newly-generated set use privilege information, with respect to granting of a use privilege due to valid use privilege and non-granting of a use privilege due to invalid use privilege (S24). In the case where there is no group node or object node having an overlapping relation, the set use privilege information is newly stored in the set use privilege storage part 324 in a releasable manner, as described above (S27).

In the case where there is a group node and a object node having an overlapping relation with respect to granting of a use privilege and non-granting of a use privilege, a determination is made on the basis of the link information existing on the shortest route having the minimum number of links among a plurality of routes for connecting both, as to whether to grant the privilege to use the target object of the object node in the overlapping relation and the subordinate object node thereof if there are any to the member of the group node in the overlapping relation and the subordinate group node if there are any (S25). The link information is the total number of existing links including links for connecting between nodes, a privilege-valid link, and a privilege-invalid link.

In the example of FIG. 10, a determination as to whether to grant the privilege to use the object D is made on the basis of the link information existing on the shortest route having the minimum number of links among the plurality of routes for connecting both sides which are the member 1 and the member 2 of the group node of the group 6 and the object D as the target object of the object node in the overlapping relation by the privilege-valid link between the group 3 and the object C and the privilege-invalid link between the group 6 and the object D.

In other words, the route connecting the group 6 and the object D through the privilege-valid link has three links including the link for connecting the group 3 and the group 6, the privilege-valid link for connecting the group 6 and the object C, and the link connecting the object C and the object D, while the route connecting the group 6 and the object D through the privilege-invalid link has only one link of the privilege-invalid link, and thus the route connecting through the privilege-invalid link has the minimum number of links and is the shortest route. Therefore, a determination is made not to grant the use privilege, that is, to make the use privilege invalid, on the basis of the privilege-invalid link information which is the link information existing on the shortest route.

Then, the set use privilege information based on granting/non-granting of a use privilege is replaced with and stored in the set use privilege storage part 324 in a releasable manner. Alternatively, in the case of being identical to the set use privilege information having been stored in the set use privilege storage part 324, the set use privilege information is maintained in a releasable manner (S26). FIG. 12(*a*) and FIG. 12(*b*) respectively show the privilege-valid link information and the privilege-invalid link information, and the set use privilege information stored in the set use privilege storage part 324 after the processing, according to the example.

In the case where a group node and an object node are connected through a route by a privilege-invalid link and where non-granting of a use privilege is set between the group of the group node and the subordinate groups thereof if there are any and the object node and the subordinate objects thereof if there are any, if the shortest route having the minimum number of links by a privilege-valid link is set between a required group node and a required object node under the above-described privilege-invalid relation, the privilege to use the target object of the required object node and the target objects of the subordinate object node thereof if there are any is enabled and granted to the member of the required group node and the member of the subordinate group node thereof if there are any.

In the case where, regarding the group node and the object node in the overlapping relation with respect to granting of a use privilege and non-granting of a use privilege, both sides are connected in the overlapping relation with respect to granting of a use privilege and non-granting of a use privilege by a plurality of shortest routes respectively being equal in number of links and being equal in distance, the control part 2 of the privilege information management apparatus 1 preferably grants the privilege to use the target objects of the object node in the overlapping relation and the subordinate object nodes thereof if there are any to the member of the group node in the overlapping relation and the member of the subordinate group node if there are any.

Figure 13:
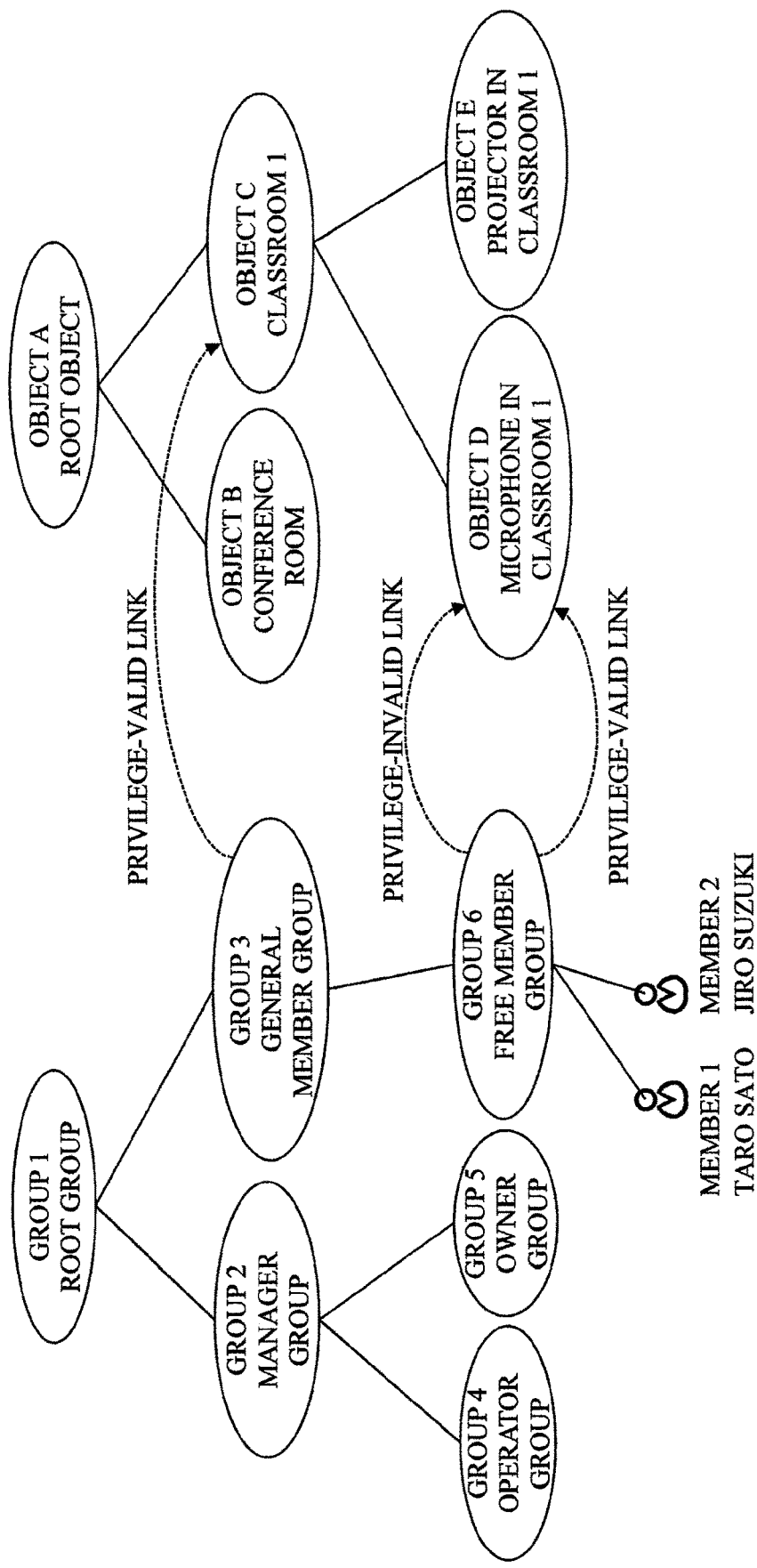
FIG. 13 is a block diagram illustrating a state in which, in the state of FIG. 10, the group node of the group 6 and the object node of the object D are connected by the privilege-valid link information.
Figure 14:
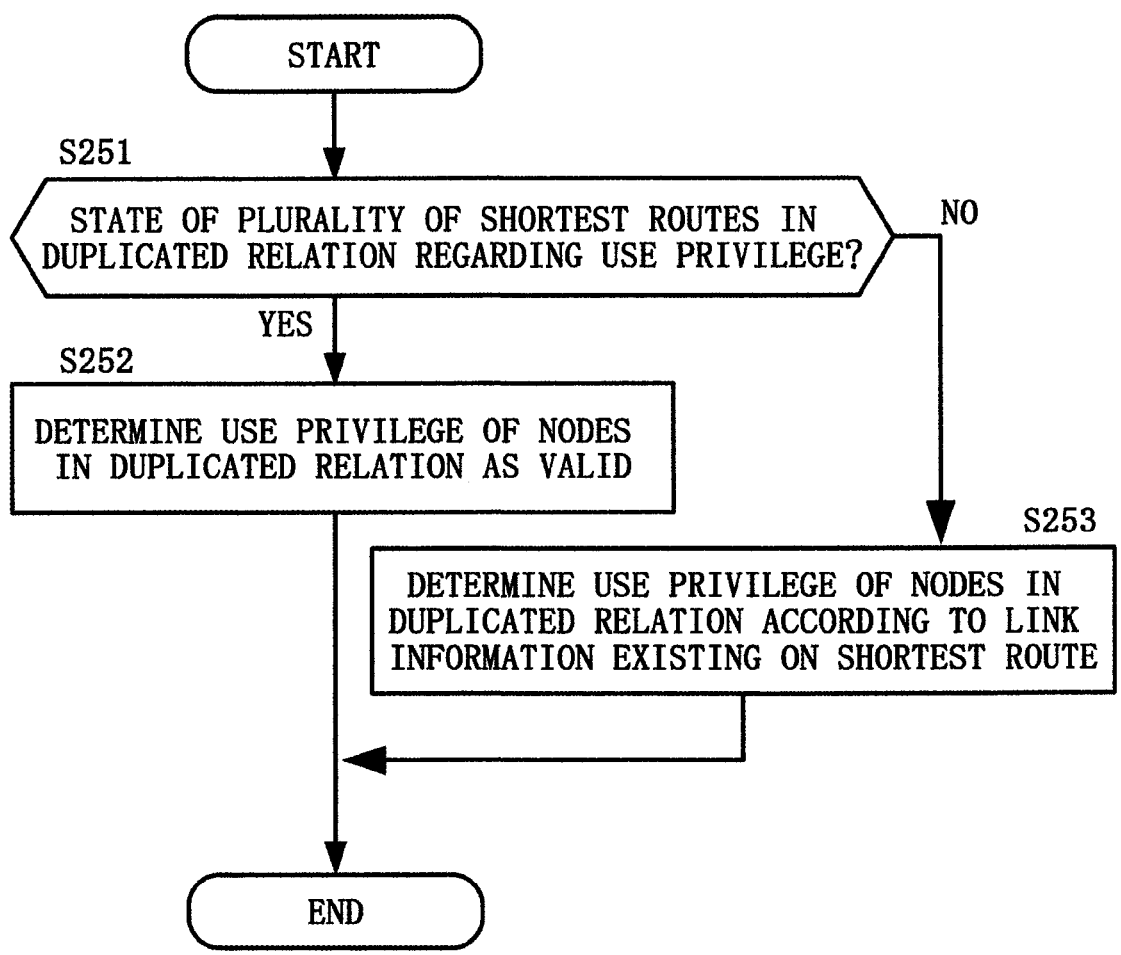
FIG. 14 is a flowchart indicating an example of processing of setting the set use privilege information through connection by use of the privilege-valid link information of FIG. 13.

In the example shown in FIG. 13 and FIG. 14, in the case where the group 6 and the object D are connected through the privilege-invalid link having a link number: 1 and are further connected through the privilege-valid link having a link number: 1, a determination as to whether or not there is a plurality of shortest routes in an overlapping relation with respect to granting of a use privilege and non-granting of a use privilege is made in the processing of determining whether to grant the use privilege on the basis of the link information in S24 as described above (S251). In the case where there is no plural shortest route or where there is no overlapping relation with respect to granting of a use privilege and non-granting of a use privilege, a determination is made as to whether to grant the use privilege on the basis of the link information of the shortest route (S253). While, as shown in FIG. 13, in the case where there is a plurality of shortest routes and where there is an overlapping relation with respect to granting of a use privilege and non-granting of a use privilege, the privilege to use the object D is determined to be granted to the group 6 and the members belonging to the group 6 (S252). FIG. 15(a) and FIG. 15(b) respectively show the privilege-valid link information and the privilege-invalid link information, and the set use privilege information stored in the set use privilege storage part 324 after the processing, according to the example.

According to the first embodiment, in the case where the privilege to use an arbitrary target object or arbitrary target objects is granted to an arbitrary group or arbitrary groups, the use privilege is granted simply by connecting the group node and the object node in a privilege-valid mode. In the case of releasing the state where the use privilege is granted, the use privilege is released simply by the deletion of the privilege-valid link information for deletion of the connection. Accordingly, privilege management having high flexibility and promptness is realized in the privilege management for managing a privilege required by a user to use a use object. For example, in the case of granting or releasing of a privilege to use a specific use object such as traveling or a lesson to a group formed in a hierarchical structure on a website at any time, management requiring flexibility and promptness is preferably performed.

As an example, in the case where a privilege to use arbitrary target objects is granted to arbitrary groups by the above-described processing of granting/non-granting of the use privilege with respect to the group node and the object node in the overlapping relation, connection in the privilege-invalid mode between the subordinate group under the group directly connected in the privilege-valid mode and the subordinate target object under the target object directly connected in the privilege-valid mode restricts a specific group from using a specific target object. This enables the implementation of flexible management adaptable in more various cases, such as a case where a group not having paid a fee yet is disabled from using a service. A determination as to whether to grant a use privilege in the case of being in an overlapping relation is made on the basis of the link information existing on the shortest route having the minimum number of links, thereby enabling to perform prompt determination as to whether to grant the use privilege without requiring complicated calculation processing.

In the case where there are only routes that are equal in distance as the shortest connection route between the group and the target object in an overlapping relation with respect to granting of a use privilege and non-granting of a use privilege, uniform granting of a use privilege enables to provide group members with a service by the target object while securing a more beneficial state.

[Privilege Information Management System and Privilege Information Management Program of a Second Embodiment]

In a privilege information management system of the second embodiment according to the present invention, which also has the same basic configuration as that of the first embodiment, being configured with the privilege information management apparatus 1 of FIG. 1 similar to the first embodiment, and having the configuration of the data storage part 32 of FIG. 2, individual link information in which a member node of an individual member defined in a master and slave relation with a group node and an arbitrary object node are connected in a privilege-valid mode or in a privilege-invalid mode is stored in the link information storage part 323 in a releasable manner, and a determination as to whether to grant the privilege to use the target object of the arbitrary object node to the individual member is made, giving top priority to the mode of the individual link information.

Figure 16:
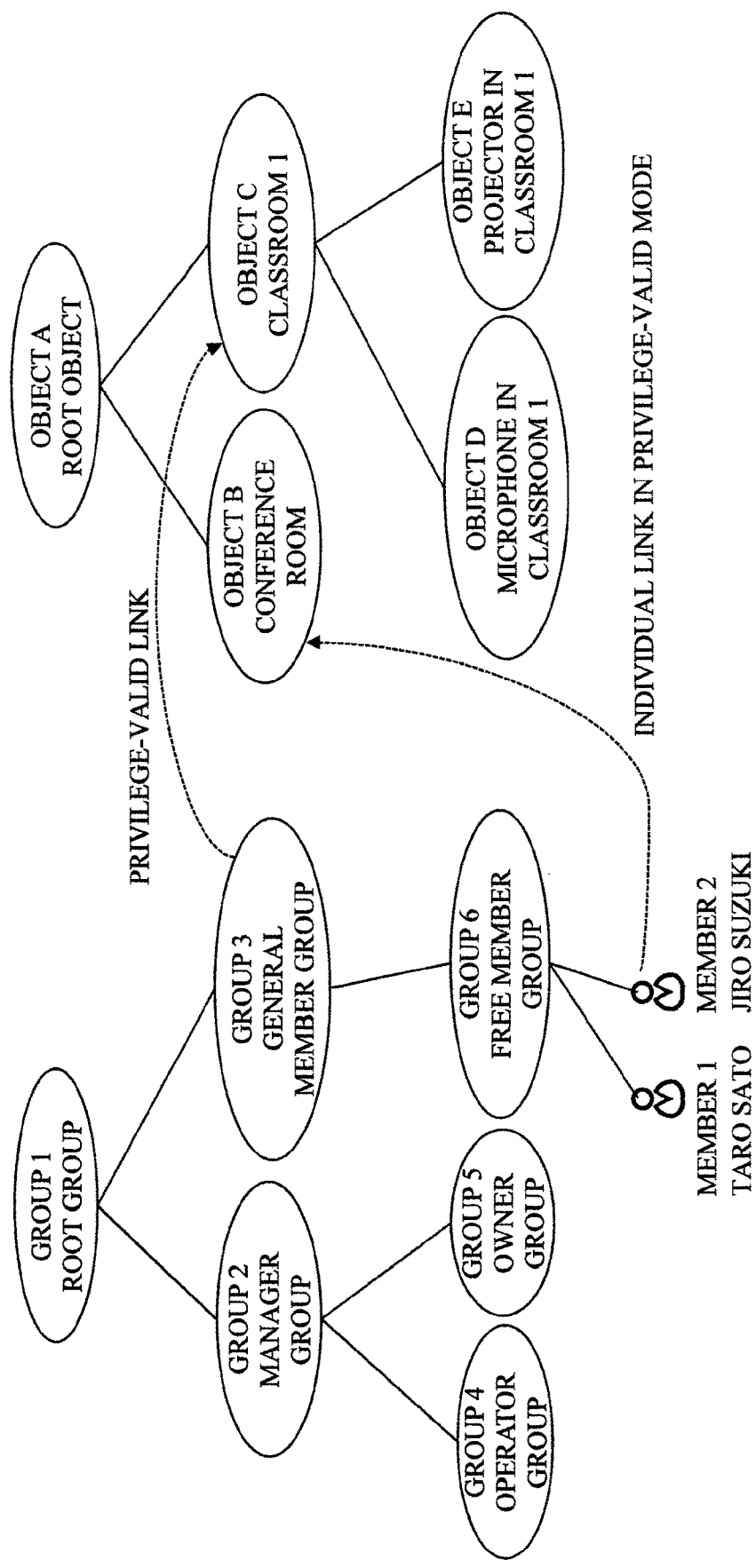
FIG. 16 is a block diagram illustrating a state in which, in the state of FIG. 7, the member node of a member 2 belonging to the group 6 and the object node of an object B are connected by the privilege-valid individual link information.
Figure 17:
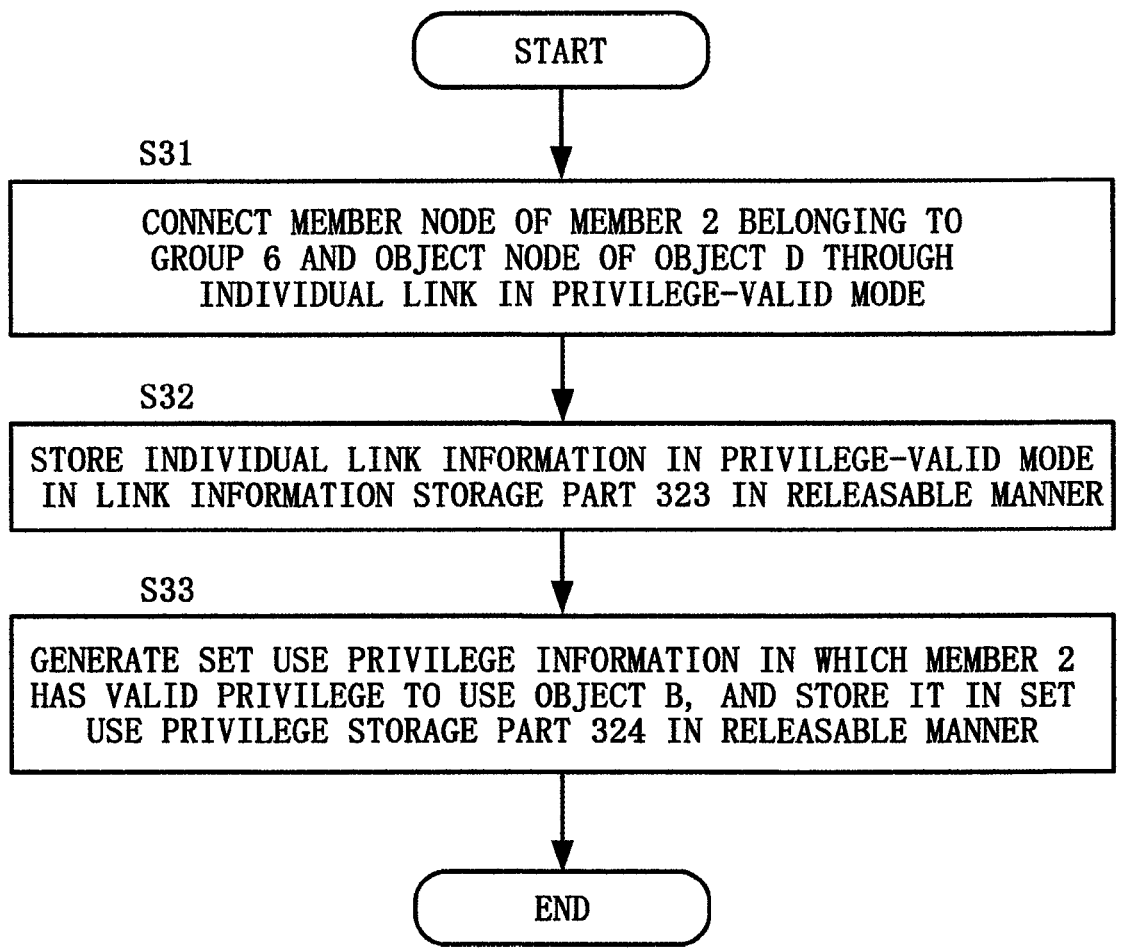
FIG. 17 is a flowchart indicating an example of processing of setting the set use privilege information through connection by use of the individual link information of FIG. 16.

In the privilege information management apparatus 1, in the case where a member node of the individual member defined in a master and slave relation with a group node in the group tree stored in the group tree storage part 321 and an object node in the object tree stored in the object tree storage part 322 are connected by the individual link information in a privilege-valid mode, the control part 2 connects, as shown in FIG. 16 and FIG. 17 as an example, in response to input from the input part 4 or in response to a reception or input from the external terminal 12, the member node of the member 2 belonging to the designated group 6 and the object node of the designated object B by the individual link information in the privilege-valid mode (S31), and stores the individual link information in the privilege-valid mode in the link information storage part 323 in a releasable manner (S32).

The control part 2 further generates the set use privilege information in which the member 2 has a valid privilege to use the object B, and stores the set use privilege information in the set use privilege storage part 324 in a releasable manner (S33). At this time, in the case where the set use privilege information of the privilege to use the object B of the member 2 has been stored in the set use privilege storage part 324 on the basis of the link information between the group node and the object node, the control part 2 replaces it with the set use privilege information generated on the basis of the individual link information and stores the information. FIG. 18(a), FIG. 18(b), and FIG. 18(c) respectively show the privilege-valid link information, the individual link information, and the set use privilege information stored in the set use privilege storage part 324 after the processing, according to the example. It is noted that the same processing is also performed in the case of being in the privilege-invalid mode.

Figure 19:
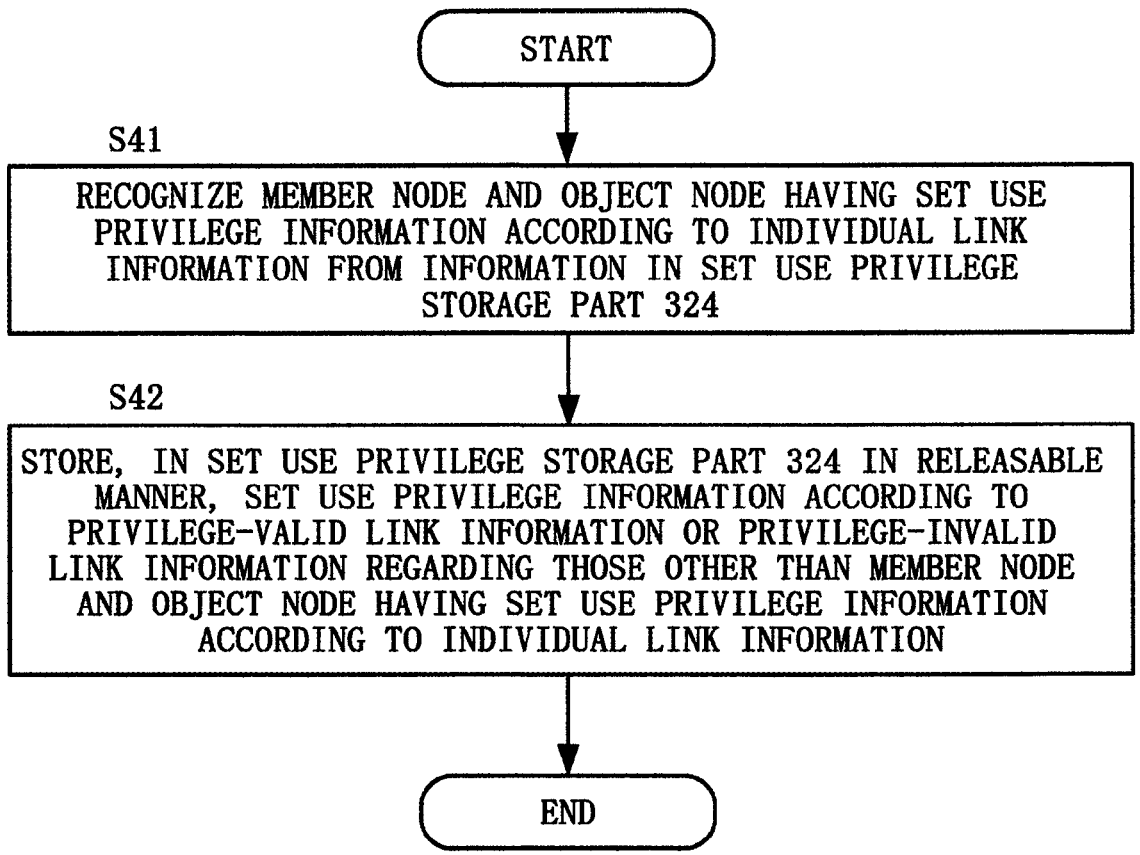
FIG. 19 is a flowchart indicating an example of processing performed in the case where a group node and an object node are connected by the privilege-valid link information or the privilege-invalid link information in a state where the set use privilege information based on the individual link information has been stored.

In the case where a group node and an object node are connected by privilege-valid information or privilege-invalid information in the state where the set use privilege information generated on the basis of the individual link information has been stored in the set use privilege storage part 324, and where the set use privilege information by the privilege-valid link information or the privilege-invalid link information is to be stored in the set use privilege storage part 324, the control part 2 recognizes and checks, as shown in FIG. 19, the member node and the object node having the set use privilege information by the individual link information from the information in the set use privilege storage part 324 (S41), and stores, in the set use privilege storage part 324 in a releasable manner, the set use privilege information by the privilege-valid link information or the privilege-invalid link information with respect to a member node and an object node other than those having the set use privilege information by the individual link information (S42). Configurations other than these are the same as those of the first embodiment.

According to the second embodiment, the configuration corresponding to the first embodiment enables to produce corresponding effects, and a determination as to whether to grant a use privilege to an individual member by giving the top priority to the mode of individual link information enables to more flexibly provide a service by a target object suitable for the state or the demand of the individual member.

[Modifications of Embodiments]

The invention disclosed in the present specification includes, within the applicable range, in addition to the configurations of respective inventions and embodiments, configurations in which the above configurations are partially modified to become configurations other than those disclosed in the present specification, configurations in which a configuration other than those disclosed in the present specification is added to the above configurations, or the superordinate concept in which the above configurations are partially deleted to the extent that a partial effect can be obtained. The following modifications are also included.

As an example, the above-described embodiment is configured so that only a lowest group has a member as a subordinate or such a member only belongs to a lowest group. The present invention also includes a configuration in which a member directly belongs to a group higher than the lowest group, for example, a case in which the member 1 and the member 2 belong to the group 6 in FIG. 3 and a member 3 not belonging to the group 6 directly belongs to the group 3. This invention further includes a configuration in which a releasing mode is set so as to release privilege-valid link information, privilege-invalid link information, or individual link information, in addition to a configuration in which such information is deleted, and includes an appropriate configuration in which the state set by these link connections with respect to granting/non-granting of a use privilege is disabled. The members of a group node according to the present invention include the members directly belonging to the group, and also include the members directly belonging to the subordinate group node thereof in a master and slave relation, that is, indirectly belonging to the upper group node.

The above-described embodiments are configured to generate the set use privilege information and store it in advance in the set use privilege storage part 324, in response to connection by the privilege-valid link information, the privilege-invalid link information or the individual link information, or storage thereof in the link information storage part 323. Alternatively, another configuration is available, in which a storage part is not disposed in the set use privilege storage part 324, connection by the privilege-valid link information, the privilege-invalid link information, or the individual link information or storage thereof in the link information storage part 323 are performed, and in which the control part 2 performs, every time the inquiry of a use privilege of an arbitrary group node or member node with respect to an arbitrary object node is input, calculation processing of recognizing the use privilege of the inquired group node or member node with respect to the arbitrary object node by tracing the group tree and the object tree, and thereby determines whether to grant the use privilege.

The connection by the privilege-valid link information, the privilege-invalid link information, or the individual link information may be set in any order, and the link information positioned higher and the link information positioned lower may be set in any order.

INDUSTRIAL APPLICABILITY

The present invention is available in information processing for granting a privilege to participate in traveling, a lesson, or the like to a group formed on a website, as an example.

REFERENCE SIGNS LIST

1 . . . privilege information management apparatus
2 . . . control part
3 . . . storage part
31 . . . program storage part
32 . . . data storage part
321 . . . group tree storage part
322 . . . object tree storage part
323 . . . link information storage part
324 . . . set use privilege storage part
4 . . . input part
5 . . . image display part
6 . . . communication part
11 . . . communication network
12 . . . external terminal

The invention claimed is:

1. A privilege information management system comprising:
   a memory; and
   a processor connected to the memory, the processor being configured to:
      store, in the memory, a group tree configured with group nodes each representing a group configured with a member enabled to use a privilege;
      store, in the memory, an object tree configured with object nodes each representing a target object to be used with the privilege;
      store, in a releasable manner, in the memory, privilege-valid link information indicating a connection between an arbitrary group node of the group nodes and an arbitrary object node of the object nodes in a privilege-valid mode;
      regarding a first group node of the group nodes and a first object node of the object nodes connected by the privilege-valid link information, grant a use privilege to use a target object of the first object node and a subordinate object node if there are any under the first object node to a member belonging to the first group node and a subordinate group node if there are any under the first group node;
      store, in the releasable manner, in the memory, privilege-invalid link information indicating a connection between an arbitrary group node of the group nodes and an arbitrary object node of the object nodes in a privilege-invalid mode;
      regarding a second group node of the group nodes and a second object node of the object nodes connected by the privilege-invalid link information, not grant a privilege to use a target object of the second object node and a subordinate object node if there are any under the second object node to a member belonging to the second group node and the subordinate group node if there are any under the second group node; and determine, on the basis of link information existing on a shortest route having a minimum number of links among a plurality of routes for connecting the group node and the object node in an overlapping relation with respect to granting of the use privilege and non-granting of the use privilege, whether to grant the privilege to use the target object of the object node in the overlapping relation and a subordinate object node if there are any under the object node to the member belonging to the group node in the overlapping relation and the subordinate group node if there are any under the group node.

2. The privilege information management system according to claim 1, wherein the processor is further configured to:

grant, in a case where, regarding the group node and the object node in the overlapping relation with respect to granting of a use privilege and non-granting of a use privilege, both are connected in the overlapping relation with respect to granting of the use privilege and non-granting of the use privilege by a plurality of shortest routes respectively being equal in number of links and equal in distance, the privilege to use the target object of the object node in the overlapping relation and the subordinate object node if there are any under the object node to the member belonging to the group node in the overlapping relation and the subordinate group node if there are any under the group node.

3. The privilege information management system according to claim 1, wherein the processor is further configured to:

store, in the releasable manner, individual link information indicating a connection between a member node of an individual member defined in a master and slave relation with the group node and an arbitrary object node of the object nodes in the privilege-valid mode or the privilege-invalid mode; and determine whether to grant the privilege to use the target object of the arbitrary object node to the individual member by giving top priority to the mode of the individual link information.

4. A non-transitory computer readable storage medium storing a privilege information management program for making a computer function so as to:

store a group tree configured with group nodes each representing a group configured with a member enabled to use a privilege;

store an object tree configured with object nodes each representing a target object to be used with the privilege;

store, in a releasable manner, privilege-valid link information indicating a connection between an arbitrary group node of the group nodes and an arbitrary object node of the object nodes in a privilege-valid mode;

regarding a first group node of the group nodes and a first object node of the object nodes connected by the privilege-valid link information, grant a use privilege to use a target object of the first object node and a subordinate object node if there are any under the first object node to a member belonging to the first group node and a subordinate group node if there are any under the first group node;

store, in the releasable manner, privilege-invalid link information indicating a connection between an arbitrary group node of the group nodes and an arbitrary object node of the object nodes in a privilege-invalid mode;

regarding a second group node of the group nodes and a second object node of the object nodes connected by the privilege-invalid link information, not grant the privilege to use a target object of the second object node and a subordinate object node if there are any under the second object node to a member belonging to the second group node and a subordinate group node if there are any under the second group node; and determine, on the basis of link information existing on a shortest route having a minimum number of links among a plurality of routes for connecting the group node and the object node in an overlapping relation with respect to granting of the use privilege and non-granting of the use privilege, whether to grant the privilege to use the target object of the object node in the overlapping relation and a subordinate object node if there are any under the object node to the member belonging to the group node in the overlapping relation and the subordinate group node if there are any under the group node.

5. The privilege information management system according to claim 2, wherein the processor is further configured to:

store, in the releasable manner, individual link information indicating a connection between a member node of an individual member defined in a master and slave relation with the group node and an arbitrary object node of the object nodes in the privilege-valid mode or the privilege-invalid mode; and determine whether to grant the privilege to use the target object of the arbitrary object node to the individual member by giving top priority to the mode of the individual link information.

* * * * *